| United States Patent [19] | [11] 4,031,758 |
|---|---|
| Doi | [45] June 28, 1977 |

[54] MASS FLOWMETER

[76] Inventor: Nobuo Doi, Kanan-cho Daigatsuka 60, Minamikawachi, Osaka, Japan, 585

[22] Filed: Dec. 29, 1975

[21] Appl. No.: 645,231

[52] U.S. Cl. .............................................. 73/205 D
[51] Int. Cl.² .......................................... G01F 1/34
[58] Field of Search ...................... 73/194 M, 205 D

[56] References Cited

UNITED STATES PATENTS

| 3,102,423 | 9/1963 | Prindle | 73/194 M |
| 3,232,104 | 2/1966 | Fishman et al. | 73/205 D |
| 3,266,309 | 8/1966 | Fishman et al. | 73/205 D |

*Primary Examiner*—Richard C. Queisser
*Assistant Examiner*—John P. Beauchamp

[57] ABSTRACT

A pressure-difference type mass flowmeter with constant volumetric recirculation effected by a pump, with an annular flow path having four junctions each having a spur path. One pair of the alternate spur paths serve as inlet and outlet of the fluid flow to be measured, while the other pair of the alternate spur paths are connected to the recirculation pump. Four sections of the annular flow path defined by the four junctions are each provided with static fluid pressure sensing point, and a transducer gives a readout of difference in average static pressures of one pair of the alternate sensing points and of the other pair of the alternate sensing points. This readout is linearly proportional to the fluid mass flow rate.

3 Claims, 6 Drawing Figures

MASS FLOWMETER

BACKGROUND OF THE INVENTION

1. Field of the Invention

This invention relates to a pressure-difference type mass flowmeter with constant volumetric recirculation of the fluid to be measured.

2. Description of the Prior Art

As is well known, there have been contrived and actually used a variety of mass flowmeters of the type mentioned just above. Some of them require two positive displacement pumps of the exactly identical capacity, while others made do with a single pump but instead require two or four orifices to be installed in the flow path of the meter. Some require two pressure difference transducers for reading out the flow rate, while others do with single such transducer. With the recirculation always kept in constant volumetric rate, some flowmeters require, when the flow rate to be measured skips from a predetermined range to another, switching-over of the points to which the pressure difference transducer is connected; while others can anyhow give the readout with fixedly connected transducer or transducers, throughout the entire variation range of the flow rate to be measured, from zero to maximum.

Such conventional flowmeters have therefore drawbacks in that the effort for reducing the number of any one of the three groups of the component parts: pumps, orifices and difference-pressure transducers; is inevitably to lead to increasing the number of other group or groups, thus resulting at any rate in complicated overall structure. Drawbacks inherent in orifices are big pressure loss, causing waste power consumption. Moreover, orifices are apt to gather dirt, and the clogging, even though partially, will cause considerable fluctuations in their flow characteristics. Still further drawbacks are generally seen of the conventional flowmeters in that the linearity between the pressure difference readout and the mass flow rate to be measured is affected by the fluctuation of the resistance coefficient of the flow path in general, in consequence of variation in Reynolds number, namely variation in the flow rate to be measured itself (though alleviation of such fluctuation, thus rectification of non-linearity, is the main object of installing the orifices in spite of their inherent drawbacks as commented above; flow coefficient of the orifices considerably fluctuates under very wide variation in Reynolds number) and also the sensitivity of the flowmeter will fluctuate as the temperature varies.

SUMMARY OF THE INVENTION

Main object is thus to avoid the drawbacks of the conventional flowmeters and to provide a novel mass flowmeter requiring no orifices; using only a single recirculation pump and a single pressure difference transducer for direct readout of the flow rate; with no need of switching over the points to which the pressure difference transducer is connected, throughout the entire variation range of the flow rate to be measured, from zero to maximum and in any direction of the flow; with good linearity constantly established between the difference pressure readout and the mass flow rate to be measured, not affected by variation in Reynolds number; and with the sensitivity to show no substantial fluctuation under any temperature variation in the normal range.

DESCRIPTION OF THE PREFERRED EMBODIMENT

Figure 1:
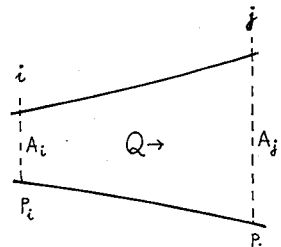
FIGS. 1–4 are all schematic views of flow paths in cross-section, shown only as reference material for theoretically analyzing the principle of the present invention.

In preparation for theoretically analyzing the principle of the present invention, reference is first made to FIG. 1, and the pressure difference between $p_i$ and $p_j$, static pressures of the fluid at the end portions $i$ and $j$, respectively, of a pipe path section $ij$ as is shown in its sectional form, is now calculated for the volumetric flow rate Q of the fluid. As premise therefor, it is now assumed (by the way, all the symbols used in this specification are to be understood as measured in "absolute units", rather than in "engineering units"):

a. the fluid is incompressible, i.e. denisty $\rho$ is always constant, b. static pressures $p_i$ and $p_j$ are uniform all over the end sectional surface $i$ and $j$, respectively, c. average sectional area of this path section $ij$, as is defined for calculating the flow resistance across this section, is expressed as $A_{ij}$.

d. average frictional stress, as is taken over the entire wall surface of this path section $ij$, has its component $\tau_{ij}$ in the direction of flow axis; (local) friction factor or frictional drag coefficient (in the sense of Fanning) is defined as $$f_{ij} = \frac{\tau_{ij}}{\frac{1}{2} \rho \left( \frac{Q}{A_{ij}} \right)^2} ;$$

and another coefficient is introduced as defined by $c_{ij} = f_{ij} S_{ij}/A_{ij}$ with $S_{ij}$ denoting the entire wall area of this path section $ij$, (thus, in case of a round pipe path section extending from $x_o$ to $x_l$ of the distance $x$ in the direction of the flow, with radius $y$ of the flow path at such distance $x$, if the friction coefficient of the wall is of a constant value $f$ all over the entire wall, then:

$$A_{ij} = \pi \cdot \frac{\int_{x_o}^{x_1} \frac{dx}{y^3}}{\int_{x_o}^{x_1} \frac{dx}{y^5}} \text{ and } c_{ij} = 2f \cdot \frac{\left\{ \int_{x_o}^{x_1} \frac{dx}{y^3} \right\}^2}{\int_{x_o}^{x_1} \frac{dx}{y^5}} )$$

e. even if eddy loss (as an effect of macroscopic vortices) be not negligible across this path section $ij$, such effect is regarded as equivalent to an increase in the wall friction (caused by viscosity effect as an accumulated action of microscopic or differential vortices) and is thus to be disposed of by increasing the frictional drag coefficient accordingly.

Under the conditions as assumed above, energy balance is shown as:

$$p_i Q + \frac{\rho}{2} Q v_i^2 = p_j Q + \frac{\rho}{2} Q v_j^2 + \frac{\rho}{2} c_{ij} \left(\frac{Q}{A_{ij}}\right)^2 Q$$

namely:

$$2 \cdot \frac{p_i - p_j}{\rho} = v_j^2 - v_i^2 + c_{ij}\left(\frac{Q}{A_{ij}}\right)^2 = Q^2 \left(\frac{1}{A_j^2} - \frac{1}{A_i^2} + \frac{c_{ij}}{A_{ij}^2}\right) \quad (1)$$

Figure 2:
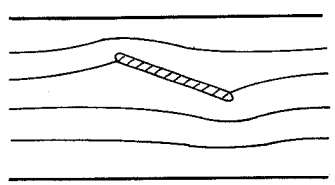
Figure 3:
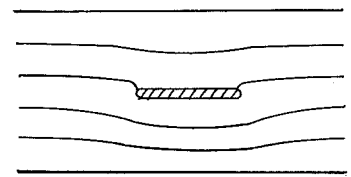

Said assumption (b) is to consider that the end portions $i$ and $j$ are both remote enough from any complicatedly shaped portions in this path section $ij$, such for instance as obstacles in the flow path, if any, as illustrated by way of example, for better understanding, in FIGS. 2 and 3 in which streamlines are schematically shown in sectional view of the flow paths with obstacles therein (it is considered that the obstacle in FIG. 3 has its upper surface with larger frictional coefficient than that of its lower surface).

Figure 4:
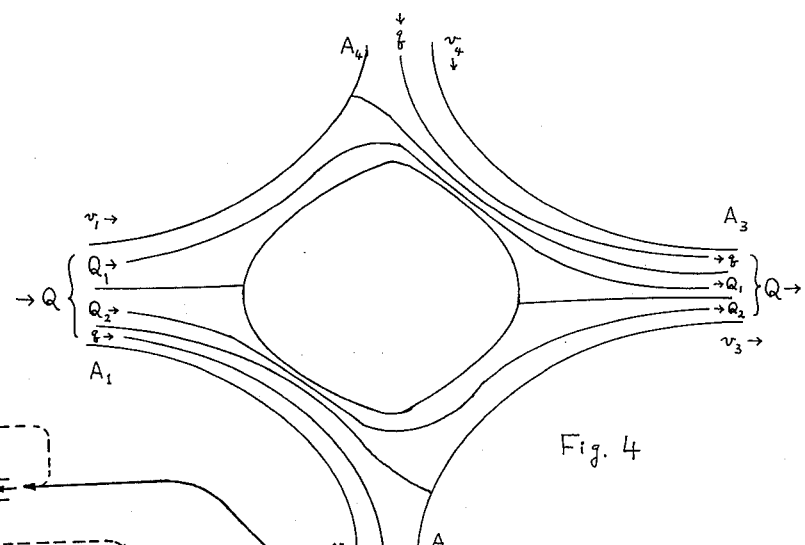

Upon the preparation as above, consideration is now made with regard to a flow path network with the sectional view as shown in FIG. 4. As is immediately seen from this FIG. 4, the following equation must always be satisfied:

$$Q_1 + Q_2 = Q$$

namely $$Q_2 = Q - q - Q_1 \quad (2)$$

Looking at this FIG. 4, one might understand that the stream tube designated by volumetric flow rate $Q_2$ in the region of the lefthand end portion 1, as well as the stream tube designated by volumetric flow rate $Q_1$ in the region of the righthand end portion 3, would not touch the wall of the conduit pipe. However, assumption should here be made as: f. actual conduits being three-dimensional pipes with their walls having self-closing shape in cross-section, and the fluid flowing therein normally being in turbulent state excepting very special, rather unusual case where laminar flow is realized; the sectional stream tubes, though they might theoretically be distinguished one from another as illustrated, would in fact all commingle together thus to be in contact with the wall all in uniform manner and to have uniform average flow speed at either end of the conduit, i.e. $v_1$ at end portion 1 and $v_3$ at end portion 3 in the illustrated instance.

Attempting under this supposition to apply formula (1) to the stream tubes designated by flow rates $Q_1$ and $Q_2$, respectively, there yet are too many difficulties to perform exact theoretical analysis since the shape of these stream tubes are to vary in very complicated way in accordance with variation of $Q$ and/or $q$, in the given shape of the flow path network of FIG. 4. In order thus to anyhow perform the analysis though somewhat approximately, another supposition is here to be made, as: g. the dissipated pressure loss along the stream tube designated by flow rate $Q_1$ may be considered as the sum of the loss to occur across the path section 1–4 in a flow of volumetric rate $Q_1$ and the loss to occur across the path section 4–3 in a flow of volumetric rate $Q_1+q$;

and similar consideration is to be made, mutatis mutandis, also with respect to the stream tube designated by flow rate $Q_2$.

Under these suppositions ($f$ and $g$), formula (1) will give, when applied to the stream tube designated by flow rate $Q_1$:

$$2\frac{p_1 - p_3}{\rho} = v_3^2 - v_1^2 + \frac{c_{14}}{A_{14}^2} Q_1^2 + \frac{c_{43}}{A_{43}^2}(Q_1 + q)^2 \quad (3)$$

and similarly, when applied to the stream tube designated by flow rate $Q_2$:

$$2\frac{p_1 - p_3}{\rho} = v_3^2 - v_1^2 + \frac{c_{12}}{A_{12}^2}(Q_2 + q)^2 + \frac{c_{23}}{A_{23}^2} Q_2^2 \quad (4)$$

which leads, under application of formula (2), to:

$$2\frac{p_1 - p_3}{\rho} = v_3^2 - v_1^2 + \frac{c_{12}}{A_{12}^2}(Q - Q_1)^2 + \frac{c_{23}}{A_{23}^2}(Q - q - Q_1)^2 \quad (5)$$

From formulas (3) and (5), the following equation is obtained:

$$c_{14}\left(\frac{Q_1}{A_{14}}\right)^2 + c_{43}\left(\frac{Q_1 + q}{A_{43}}\right)^2 = c_{12}\left(\frac{Q - Q_1}{A_{12}}\right)^2 + c_{23}\left(\frac{Q - q - Q_1}{A_{23}}\right)^2 \quad (6)$$

As is well known, the coefficient $f_{ij}$, and consequently $c_{ij}$, too, as defined in said supposition (d) will vary over a considerably wide range as a function of Reynolds number in accordance with variation of flow rate $Q$, even when the path section $ij$ is given in a fixed shape. It is only in the high Reynolds number range commonly known as the flow of "completely rough surface" state, that these coefficients are stable.

In order to realize the pressure difference readout as linearly proportional to the mass flow rate to be measured, it is common in the conventional pressure-difference type mass flowmeter with constant volumetric recirculation, especially so in the single-pump type, to install, for prevention of said variation in the resistance coefficient, orifices of very small aperture so that the flow resistance in the path other than the orifices are negligible in comparison with the resistance across the orifices, while admitting to consider the orifice loss coefficient to be always constant excepting the case of extraordinarily small flow speed. If such orifices are not used, it is conventionally the case that the linearity can not be sufficient enough to cover wide flow rate range, and the practical measurement range was thus restricted in such case. In short, fundamental condition for establishing the principle of the operation of the conventional meters is to assume, rather quite forcedly, as:

h. flow resistance factor of each of the fluid path sections remains constant, regardless of the Reynolds number, consequently of the flow rate to be measured.

It seems that the principle of such conventional flowmeters of this type has thus far only insufficiently been analyzed and disclosed; and preparatory to specifically analyzing the principle of the present invention, the analysis of the conventional principle is first shown hereunder by way of reference:

In the flow pattern as illustrated in FIG. 4, the minimum condition for realizing the said conventional flowmeters, in addition to said condition (h), is that:

i. the illustrated flow path network must be symmetrical with respect to the horizontal center line (not shown) in this FIG. 4.

Conditions (h and i) thus give: $A_2=A_4$, $A_{14}=A_{12}$, $A_{43}=A_{23}$, $c_{14}=c_{12}$ and $c_{43}=c_{23}$; and applying these conditions to equation (6), the following equation is obtained:

$$c_{14}\left(\frac{Q_1}{A_{14}}\right)^2 + c_{43}\left(\frac{Q_1+q}{A_{43}}\right)^2 = c_{14}\left(\frac{Q-Q_1}{A_{14}}\right)^2 + c_{43}\left(\frac{Q-q-Q_1}{A_{43}}\right)^2$$

namely:

$$\frac{c_{14}}{A_{14}^2} \cdot Q(Q-2Q_1) + \frac{c_{43}}{A_{43}^2} \cdot Q\{Q-2(Q_1+q)\} = 0$$

namely:

$$Q_1 = \frac{Q}{2} - \frac{q}{1+\frac{c_{14}}{c_{43}}\left(\frac{A_{43}}{A_{14}}\right)^2} \quad (7)$$

and, from equation (2), $$Q_2 = \frac{Q}{2} - \frac{q}{1+\frac{c_{43}}{c_{14}}\left(\frac{A_{14}}{A_{43}}\right)^2} \quad (8)$$

As neither $Q_1$ nor $Q_2$ can be of minus value for maintaining the flow pattern shown in FIG. 4, condition must here be satisfied as:

$$\left.\begin{array}{l} q \leq \frac{Q}{2}\left\{1+\frac{c_{14}}{c_{43}}\left(\frac{A_{43}}{A_{14}}\right)^2\right\} \\ \\ q \leq \frac{Q}{2}\left\{1+\frac{c_{43}}{c_{14}}\left(\frac{A_{14}}{A_{43}}\right)^2\right\} \end{array}\right\} \quad (9)$$

In such conventional flowmeters, it is further supposed that:

j. a pair of fluid static pressure sensing portions are provided symmetrically with respect to the same horizontal line in FIG. 4 as mentioned in supposition (i), and the sectional area of the flow path at such sensing portions, of an indentical value in accordance with said symmetry supposition (i), is designated as A.

If one 5 of such pair of the sensing portions is in flow path section 1–4 and the other 6 in section 1–2, then equation (1) gives:

$$2 \cdot \frac{p_1 - p_5}{p} = \left(\frac{Q_1}{A}\right)^2 - \left(\frac{Q}{A_1}\right)^2 + \frac{C_{15}}{A_{15}^2} Q_1^2$$

which leads, under application of formula (7), to:

$$2 \cdot \frac{p_1-p_5}{p} = \left(\frac{1}{A^2}+\frac{C_{15}}{A_{15}^2}\right)\left\{\frac{Q}{2}-\frac{q}{1+\frac{C_{14}}{C_{43}}\left(\frac{A_{43}}{A_{14}}\right)^2}\right\}^2 - \left(\frac{Q}{A_1}\right)^2 \quad (10)$$

while said equation (1) similarly gives:

$$2 \cdot \frac{p_1-p_6}{p} = \left(\frac{Q_2+q}{A}\right)^2 - \left(\frac{Q}{A_1}\right)^2 + \frac{C_{16}}{A_{16}^2}(Q_2+q)^2$$

which leads, under application of formula (8), to:

$$2 \cdot \frac{p_1-p_6}{p} = \left(\frac{1}{A^2}+\frac{C_{16}}{A_{16}^2}\right)\left\{\frac{Q}{2}+\frac{q}{1+\frac{C_{14}}{C_{43}}\left(\frac{A_{43}}{A_{14}}\right)^2}\right\}^2 - \left(\frac{Q}{A_1}\right)^2$$

and, in consideration of: $A_{15}=A_{16}$ and $c_{15}=c_{16}$ in accordance with conditions (h and i), further to:

$$2 \cdot \frac{p_1 - p_6}{p} = \left(\frac{1}{A^2} + \frac{C_{15}}{A_{15}^2}\right)\left\{\frac{Q}{2} + \frac{q}{1 + \frac{C_{14}}{C_{43}}\left(\frac{A_{43}}{A_{14}}\right)^2}\right\}^2 - \left(\frac{Q}{A_1}\right)^2 \quad (11)$$

Subtracting formula (10) from formula (11), the following equation is obtained:

$$2 \cdot \frac{p_5 - p_6}{p} = \frac{\frac{1}{A^2} + \frac{C_{15}}{A_{15}^2}}{1 + \frac{C_{14}}{C_{43}}\left(\frac{A_{43}}{A_{14}}\right)^2} \cdot 2qQ$$

namely: (12)

$$p_5 - p_6 = \frac{\frac{1}{A^2} + \frac{C_{15}}{A_{15}^2}}{1 + \frac{C_{14}}{C_{43}}\left(\frac{A_{43}}{A_{14}}\right)^2} \cdot pqQ$$

It is thus seen that the pressure difference between $p_5$ and $p_6$ is linearly proportional to the mass flow rate to be measured, so long as the recirculation volumetric flow rate is kept constant. In this statement, it is quite immaterial which of the symbols $q$ and $Q$ to consider as the volumetric flow rate of the constant recirculation and which as the rate of the flow to be measured itself. In either case, however, said condition (9) gives restriction of the possible measurement range. Namely, with the recirculation always kept at one constant volumetric flow rate value, if $q$ designates such recirculation, then the meter is for the measurement only of large flow rate $Q$; and if $Q$ designates such recirculation, then the meter is for the measurement only of small flow rate $q$. There is, of course, a possibility of changing the mode by switching over the position of either one or both of the two pressure sensing portions, in accordance with the range of the flow rate to be measured, but such leads to complicated structure and troublesome handling of the meter.

If, contrary to the above, one 7 of said pair of the sensing portions is in flow path section 2-3 and the other 8 in section 3-4, then the following equation is obtained similarly just as above:

$$p_7 - p_8 = \frac{\frac{1}{A^2} + \frac{C_{73}}{A_{73}^2}}{1 + \frac{C_{14}}{C_{43}}\left(\frac{A_{43}}{A_{14}}\right)^2} \cdot pqQ \quad (13)$$

In any instance, it is seen from equation (12 or 13) that the sensitivity of the meter is higher with smaller sectional area A at the static pressure sensing portions, and is lower with larger area A. It is also to be noted that especially the last term of the numerator in equation (12 or 13) including $c_{15}$ or $c_{73}$ is to considerably fluctuate in accordance with temperature variation. At any rate, it is required with the conventional meters to install orifices with very small aperture in order to improve the linearity of the relationship between the difference pressure readout and the mass flow rate. Such will lead, however, to increase the head loss, and at the same time the measurement characteristics will considerably be affected by any partial clogging of the orifices. Moreover, restriction of the measurement range by condition (9) is disadvantageous as mentioned already.

The present invention is to provide a novel construction for avoiding these conventional drawbacks, in such manner that it gets rid of said condition (h) and in its stead gives configurational conditions more severe than said conventional conditions (i and j); namely:

k. four fluid static pressure sensing portions 5, 6, 7 and 8 are provided in flow path sections 1-4, 1-2, 2-3 and 4-3, respectively, and l. the flow path network, as illustrated in FIG. 4, including these four pressure sensing portions as well, must be symmetrical with respect to both the horizontal center line as mentioned in said condition (i) and the vertical center line (not shown either) in FIG. 4 at the same time (designating the sectional area of the flow path at the four sensing portions, now all of an identical value, as A).

The intention of getting rid of said condition (h) can not as yet be attained still with these severer configurational conditions, and a supplementary supposition is here indispensable for this purpose, namely as:

m. streamlines of this flow path network keeps their identical form even when all the flows are reversed (in other words, this is to suppose that the phenomena of boundary layer separation is negligible in this entire flow path network, in view that the streamlines with the phenomena of boundary layer separation can not remain identical when the flow is reversed).

It is well known to those skilled in the art that the phenomena of boundary layer separation and secondary flow are very effectively hindered by providing guide vanes and splitter plates in the junction and bend ranges.

Anyway, these conditions (k, l and m) give: $A_1=A_3$, $A_2=A_4$, $A_5=A_6=A_7=A_8=A$, $A_{14}=A_{12}=A_{23}=A43$, $c_{12}=c_{43}$, $A_{15}=A_{16}=A_{83}$, $c_{15}=c_{73}$ and $c_{16}=c_{83}$; and applying these conditions to equations (6), (2) and (1), it leads, first from equations (6), to:

$$c_{14}\left(\frac{Q_1}{A_{14}}\right)^2 + c_{12}\left(\frac{Q_1+q}{A_{14}}\right)^2 = c_{12}\left(\frac{Q-Q_1}{A_{14}}\right)^2 + c_{14}\left(\frac{Q-q-Q_1}{A_{14}}\right)^2$$

namely:

$$\frac{Q-q-2Q_1}{A_{14}^2}\left\{c_{14}(Q-q) + c_{12}(Q+q)\right\} = 0$$

namely:

$$Q_1 = Q - q/2 \quad (14)$$

and from equation (2):

$$Q_2 = Q - q/2 \quad (15)$$

thus resulting in $Q_1 = Q_2$, which is quite natural simply from said condition (m).

Applying equation (14) or (15) to equation (1), the following equations are obtained:

$$2 \cdot \frac{p_1 - p_5}{p} = \left(\frac{Q_1}{A}\right)^2 - \left(\frac{Q}{A_1}\right)^2 + c_{15}\left(\frac{Q_1}{A_{15}}\right)^2 = \left(\frac{Q-q}{2A}\right)^2 - \left(\frac{Q}{A_1}\right)^2 + c_{15}\left(\frac{Q-q}{2A_{15}}\right)^2 \quad (16)$$

$$2 \cdot \frac{p_1 - p_6}{p} = \left(\frac{Q_2+q}{A}\right)^2 - \left(\frac{Q}{A_1}\right)^2 + c_{16}\left(\frac{Q_2+q}{A_{16}}\right)^2 = \left(\frac{Q+q}{2A}\right)^2 - \left(\frac{Q}{A_1}\right)^2 + c_{16}\left(\frac{Q+q}{2A_{15}}\right)^2 \quad (17)$$

$$2 \cdot \frac{p_7 - p_3}{p} = \left(\frac{Q}{A_3}\right)^2 - \left(\frac{Q_2}{A}\right)^2 + c_{73}\left(\frac{Q_2}{A_{73}}\right)^2 = \left(\frac{Q}{A_1}\right)^2 - \left(\frac{Q-q}{2A}\right)^2 + c_{15}\left(\frac{Q-q}{2A_{15}}\right)^2 \quad (18)$$

$$2 \cdot \frac{p_8 - p_3}{p} = \left(\frac{Q}{A_3}\right)^2 - \left(\frac{Q_1+q}{A}\right)^2 + c_{83}\left(\frac{Q_1+q}{A_{83}}\right)^2 = \left(\frac{Q}{A_1}\right)^2 - \left(\frac{Q+q}{2A}\right)^2 + c_{16}\left(\frac{Q+q}{2A_{15}}\right)^2 \quad (19)$$

and calculation of equations (17)−(16)+(18)−(19) gives:

$$2 \frac{p_5 - p_6 + p_7 - p_8}{p} = \frac{2Qq}{A^2}$$

namely: $\frac{p_6 + p_7}{2} - \frac{p_6 + p_8}{2} = \frac{pQq}{2A^2}$ (20)

Figure 5:
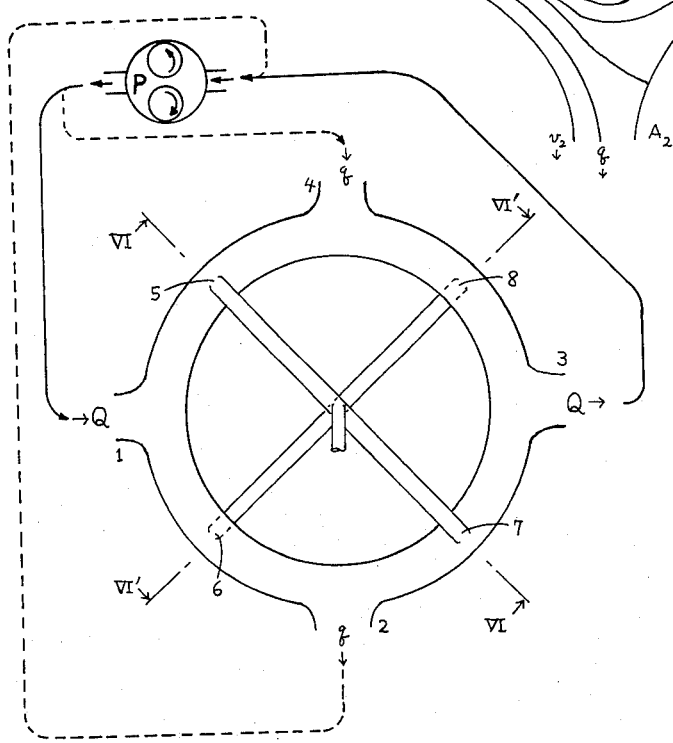
FIG. 5 is a general schematic view of the main portion of a flowmeter according to the present invention.
Figure 6:
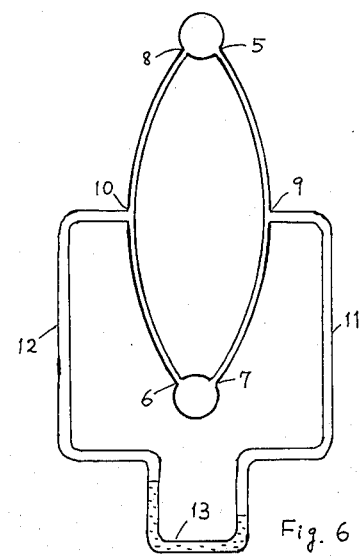
FIG. 6 is a cross-section, with righthand half thereof on a line corresponding to line VI—VI and with lefthand half thereof on a line corresponding to line VI'—VI' of FIG. 5.

A practical way of giving the left member of equation (20) is shown in FIGS. 5 and 6, which latter, FIG. 6, is shown in dual sections with the righthand side as illustrated being taken on line VI—VI and the lefthand side on line VI'—VI', both of the former, FIG. 5. In FIG. 5, the constant volumetric recirculation pump is represented schematically in the form of an officially approved graphical symbol for a gear pump, which may be connected to the spur paths either of volumetric flow rate Q as illustrated by the solid lines or of flow rate q as illustrated by the broken lines. A tube connecting the portions 5, 7 together and another tube connecting the portions 6, 8 together are each of the sectional area far smaller than that of the main duct tubes constituting the measuring flow paths themselves, so as not to affect in any significant manner the flow analysis is made hereinbefore, but are each at the same time yet large enough as to not cause fear of any partial clogging as would affect the necessary symmetry of the tube flow path with respect to the center middle point thereof, which point, 9 or 10, is thus always to show the exact average of the pressures at either end of the tube. These two tubes need not be of the identical sectional are with each other. Further tubes 11 and 12 for connecting said two center points 9 and 10 together can be any small tubes as may properly transmit the fluid pressure without clogging. In FIG. 6, means for indicating the pressure difference is shown as a manometer 13, but this indication means can be of any known type suited for this purpose. It is clear to those skilled in the art that any known transducers may be used for sensing the pressures at the pressure sensing portions 5, 6, 7 and 8, as of the type of electric resistance, electric capacitance, piezoelectricy and yet various others. Ultimate indication may as well be of any optional type, either in analog or digital way. If the pressure is transduced to electric potential, then the left member of said equation (20) may immediately be given by means of a matrix operational circuit as is also well known in the art.

At any rate, it is seen from said equation (20) that the readout of the meter is linearly proportional to the mass flow rate to be measured, so long as the recirculation volumetric flow rate is kept constant. Also in this instance, it is quite immaterial which of the symbols $q$ and $Q$ to consider as the volumetric flow rate of the constant recirculation and which as the rate of the flow to be measured itself.

Although it is true that said equations (14) and (15) give condition of:

$$Q \geq q \quad (21)$$

for maintaining the flow pattern shown in FIG. 4, theoretical analysis for the case of $Q \leq q$ is just identical, so long as the flow path network of the present invention is concerned, with the analysis for the case of $Q \geq q$, with the only difference between them of replacing the symbols Q and $q$ with each other; and the ultimate result is just said equation (20) in either case. Moreover, the consideration of reversing the flow direction of Q and/or $q$ still always retains, in the present invention, the validity of said equation (20) if said Q and $q$ are considered to have plus or minus value in accordance with the directions same as and opposite to the flow pattern shown in FIG. 4, respectively.

In short, the present invention gets rid of said rather unreasonable condition (h) as was required in the conventional meters, introducing in its stead far more moderate or reasonable condition (m) as the new fundamental basis. It is thus made needless to install orifices of big flow resistance, and, as seen from said equation (20), sensitivity of the meter according to the present invention is affected by no flow path resistance factor at all and is thus held constant even under temperature variation. As is seen also from said equation (20), the sensitivity is entirely regardless of the positions of the pressure sensing portions, so long as symmetry condition (1) is satisfied. However, it is preferable to provide the pressure sensing portions each substantially at the center middle portion of the respective flow path section as defined by two end junctions, since the fluid flow near the junctions shows very complicated pattern, and if the sensing portion is provided in such region, then a slight error in the position of the sensing portion will considerably affect the readout of the pressure and thus the tolerance in said symmetry condition (1) must be very severe in such instance.

It is certainly preferable for satisfying said condition (m) to build up the annular flow path with substantially uniform cross-section throughout the annulus excepting the regions of said four junctions. However, when high sensitivity is desired wth said constant volumetric recirculation rate kept rather small, then the cross-sectional area of the annular flow path at the pressure sensing portion should be small, and in such case it is preferable yet to keep the average cross-sectional area of the entire annular flow path as large as possible for minimizing the overall flow resistance, thus to build each of the flow path sections in venturi form.

I claim:

1. In a mass flowmeter with an endless annular pipe path for passing fluid therein, having four junctions each with a spur pipe path connected thereto, to be designated as first, second, third and fourth junction in circulatory order in any direction along the annulus, defining four pipe path sections therebetween to be designated as first pipe path section between the first and second junction, second pipe path sections between the second and third junctions, third pipe path section between the third and fourth junctions, and fourth pipe path section between the fourth and first junctions; the first junction serving as inlet of the fluid to be measured and the third junction as outlet thereof, while the second junction serving as inlet of the fluid recirculated at constant volumetric flow rate by recirculation means provided outside of said annular path and the fourth junction as outlet of the recirculation flow for returning to the recirculation means; the improvement comprising:

a. a static fluid pressure sensing portion provided in an intermediate portion of each of the pipe path sections;

b. the annular pipe path, including the shape and configuration of the static fluid pressure sensing portions, being constructed in mirror-image symmetry with respect both to a plane including a line connecting center axis of the first junction and center axis of the third junction, and partitioning the second and fourth junctions on either side thereof, and to a plane including a line connecting center axis of the second junction and center axis of the fourth junction, and partitioning the first and third junctions on either side thereof; and c. transducer means for transducing pressure difference between the average of the static fluid pressure at the sensing portion in the first pipe path section and the static fluid pressure at the sensing portion in the third pipe path section and average of the static fluid pressure at the sensing portion in the second pipe path section and the static fluid pressure at the sensing portion in the fourth pipe path section, into an indication of the mass flow rate of the fluid to be measured.

2. The mass flowmeter of claim 1 in which the annular pipe path has a uniform cross-section throughout the entire annulus excepting the junctions.

3. The mass flowmeter of claim 1 in which cross-sectional area of the annular pipe path at the static fluid pressure sensing portions is made smaller than average cross-sectional area of the entire annular pipe path.

* * * * *